(12) United States Patent
Talbot

(10) Patent No.: US 9,344,674 B2
(45) Date of Patent: May 17, 2016

(54) METHOD AND SYSTEM FOR ROUTING VIDEO CALLS TO A TARGET QUEUE BASED UPON DYNAMICALLY SELECTED OR STATICALLY DEFINED PARAMETERS

(71) Applicant: Purple Communications, Inc., Los Gatos, CA (US)

(72) Inventor: Chris Talbot, Rocklin, CA (US)

(73) Assignee: Wilmington Trust, National Association, as Administrative Agent, Wilmington, DE (US)

( * ) Notice: Subject to any disclaimer, the term of this patent is extended or adjusted under 35 U.S.C. 154(b) by 0 days.

(21) Appl. No.: 14/335,552

(22) Filed: Jul. 18, 2014

(65) Prior Publication Data

US 2015/0022616 A1     Jan. 22, 2015

Related U.S. Application Data

(60) Provisional application No. 61/856,426, filed on Jul. 19, 2013.

(51) Int. Cl.
| | |
|---|---|
| *H04N 7/14* | (2006.01) |
| *G09B 21/00* | (2006.01) |
| *G06Q 10/10* | (2012.01) |
| *H04M 3/42* | (2006.01) |

(52) U.S. Cl.
CPC .............. *H04N 7/147* (2013.01); *G06Q 10/10* (2013.01); *G09B 21/009* (2013.01); *H04M 3/42229* (2013.01); *H04M 2201/50* (2013.01); *H04M 2242/12* (2013.01)

(58) Field of Classification Search
CPC . H04N 7/147; H04M 3/42229; G09B 21/009; G06Q 10/10
USPC ......... 345/156; 348/14.01, 14.07; 379/48, 52, 379/201.01, 265.12, 266.06; 704/270.1, 704/235; 725/106; 455/414.4
See application file for complete search history.

(56) References Cited

U.S. PATENT DOCUMENTS

| | | | | |
|---|---|---|---|---|
| 6,570,963 B1 * | 5/2003 | Watson | ................ | G09B 21/009 348/14.08 |
| 7,016,479 B2 * | 3/2006 | Flathers | .............. | H04L 12/2854 379/265.13 |
| 7,142,643 B2 * | 11/2006 | Brooksby | ........... | H04M 1/2745 379/355.03 |
| 7,583,286 B2 * | 9/2009 | Brooksby | ......... | H04L 29/06027 348/14.01 |
| 7,742,068 B2 * | 6/2010 | Cupal | ............... | H04M 3/42391 348/14.01 |

(Continued)

*Primary Examiner* — Gerald Gauthier
(74) *Attorney, Agent, or Firm* — Scheinberg & Associates, P.C.

(57) ABSTRACT

A computer-implemented method routes a video relay service call to a call queue corresponding to a preferred language after receiving an input from a user to initiate a video relay service call. The preferred language may be stored in connection with the phone number being called, and the system automatically routes the video relay service call to a call queue for one or more sign language interpreters fluent in the language associated with the telephone number. If there is no default language associated with the phone number being called, the caller can be asked for a language, or a default language can be used.

20 Claims, 4 Drawing Sheets

(56) References Cited

U.S. PATENT DOCUMENTS

| | | | | |
|---|---|---|---|---|
| 7,746,984 B2* | 6/2010 | Nola | H04M 3/42391 379/52 |
| 7,746,985 B2* | 6/2010 | Armstrong | H04M 3/42391 379/52 |
| 8,345,827 B2* | 1/2013 | Liebermann | G09B 21/001 379/48 |
| 8,374,325 B2* | 2/2013 | Robotka | H04M 3/42 348/14.01 |
| 8,498,383 B2* | 7/2013 | Harris | H04M 7/003 379/52 |
| 8,588,399 B2* | 11/2013 | Paras | H04M 3/5125 379/265.09 |
| 8,610,755 B2* | 12/2013 | Brooksby | H04M 11/08 348/14.01 |
| 8,976,220 B2* | 3/2015 | Maxwell | H04N 7/007 348/14.07 |
| 8,989,355 B2* | 3/2015 | Barton | H04M 3/42391 379/52 |
| 2005/0086699 A1* | 4/2005 | Hahn | H04M 3/42391 725/106 |
| 2005/0216252 A1 | 9/2005 | Schoenbach et al. | |
| 2006/0026001 A1* | 2/2006 | Bravin | G09B 21/009 704/270.1 |
| 2006/0125914 A1 | 6/2006 | Sahashi | |
| 2007/0057912 A1* | 3/2007 | Romriell | G06F 3/017 345/156 |
| 2009/0111440 A1* | 4/2009 | Rizzi | H04L 12/583 455/414.4 |
| 2010/0142683 A1* | 6/2010 | Goldman | G06K 9/00355 379/52 |
| 2013/0051549 A1* | 2/2013 | Klemm | H04M 3/5238 379/266.06 |
| 2013/0093830 A1* | 4/2013 | Richardson | H04N 7/147 348/14.01 |
| 2013/0156179 A1 | 6/2013 | Reynolds et al. | |
| 2015/0022616 A1* | 1/2015 | Talbot | H04N 7/147 348/14.01 |
| 2015/0215251 A1* | 7/2015 | Parent | G09B 21/009 709/206 |
| 2015/0317975 A1* | 11/2015 | Ruiz Rodriguez | H04M 3/533 704/235 |

\* cited by examiner

METHOD AND SYSTEM FOR ROUTING VIDEO CALLS TO A TARGET QUEUE BASED UPON DYNAMICALLY SELECTED OR STATICALLY DEFINED PARAMETERS This Application claims priority from U.S. Provisional Pat. App. No. 61/856,426, filed Jul. 19, 2013, which is hereby incorporated by reference.

TECHNICAL FIELD OF THE INVENTION

The present invention relates to video telephony and video relay service (VRS) and in particular to the routing of video calls for callers who are deaf, hard-of-hearing, or speech impaired.

BACKGROUND OF THE INVENTION

Traditional telephony presents a problem for persons who are who are deaf, hard of hearing, or speech-impaired (D-HOH-SI). Communication by telephone requires each party to a telephone call to be able to hear and/or speak to the other party on the call to communicate. For hearing or speech impaired persons, audio communication is difficult or impossible, making telephone communication difficult or impossible.

Early approaches to facilitating telecommunications for D-HOH-SI persons included telecommunications relay service (TRS). TRS services are text-based and enable a D-HOH-SI person to communicate with other people over an existing telecommunications network using devices capable of transmitting and receiving text characters over the telecommunications network. Such devices include the telecommunications device for the deaf (TDD) and the teletypewriter (TTY). TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of video relay services (VRS) by D-HOH-SI persons. Using VRS equipment, D-HOH-SI persons can place video calls to communicate between themselves and with hearing individuals using sign language. VRS equipment can be used to talk to others via a sign language interpreter, who uses a conventional telephone at the same time to communicate with the party or parties with whom the D-HOH-SI person wants to communicate. The interpretation flow is normally within the same principal language, such as American Sign Language (ASL) to spoken English or spoken Spanish. For example, Purple Communications, Inc. of Rocklin, Calif., assignee of the present invention, provides English and Spanish ASL video interpreting to individuals who are deaf, hard-of-hearing, or speech impaired and who can communicate via ASL.

In the prior art, VRS systems are set to a default spoken language, such as English or Spanish. When a D-HOH-SI person needs to call a hearing person that speaks a language other than the default language, the person must place a VRS call, wait in the call queue for the next available ASL interpreter, and then, when the next available translator becomes available, ask to be transferred to the call queue of a the different language, where the person must then wait for the next available ASL interpreter in the different language call queue.

For example, if a D-HOH-SI person is fluent in English, that person is likely to place most calls to English speaking hearing persons and will therefore set the default language on the VRS equipment to English. When the D-HOH-SI person makes a VRS call, the VRS equipment places the D-HOH-SI person in the call queue for an English ASL interpreter. However, if the D-HOH-SI person needs to make a call to a hearing person who communicates in Spanish, the VRS equipment still places the D-HOH-SI person in the call queue for an English ASL interpreter, which may require a wait. When an English ASL interpreter answers the call, the D-HOH-SI person must ask the English ASL interpreter to transfer the call to the call queue for a Spanish ASL interpreter, which may require another wait. The wait in the call queue for an English ASL interpreter is unnecessary, which wastes the time of the D-HOH-SI person and other persons behind that person in the call queue.

SUMMARY OF THE INVENTION

A computer-implemented method routes a video relay service call to a call queue corresponding to a preferred language after receiving an input from a user to initiate a video relay service call. The preferred language may be stored in connection with the phone number being called, and the system automatically routes the video relay service call to a call queue for one or more sign language interpreters fluent in the language associated with the telephone number. If there is no default language associated with the phone number being called, the caller can be asked for a language, or a default language can be used.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
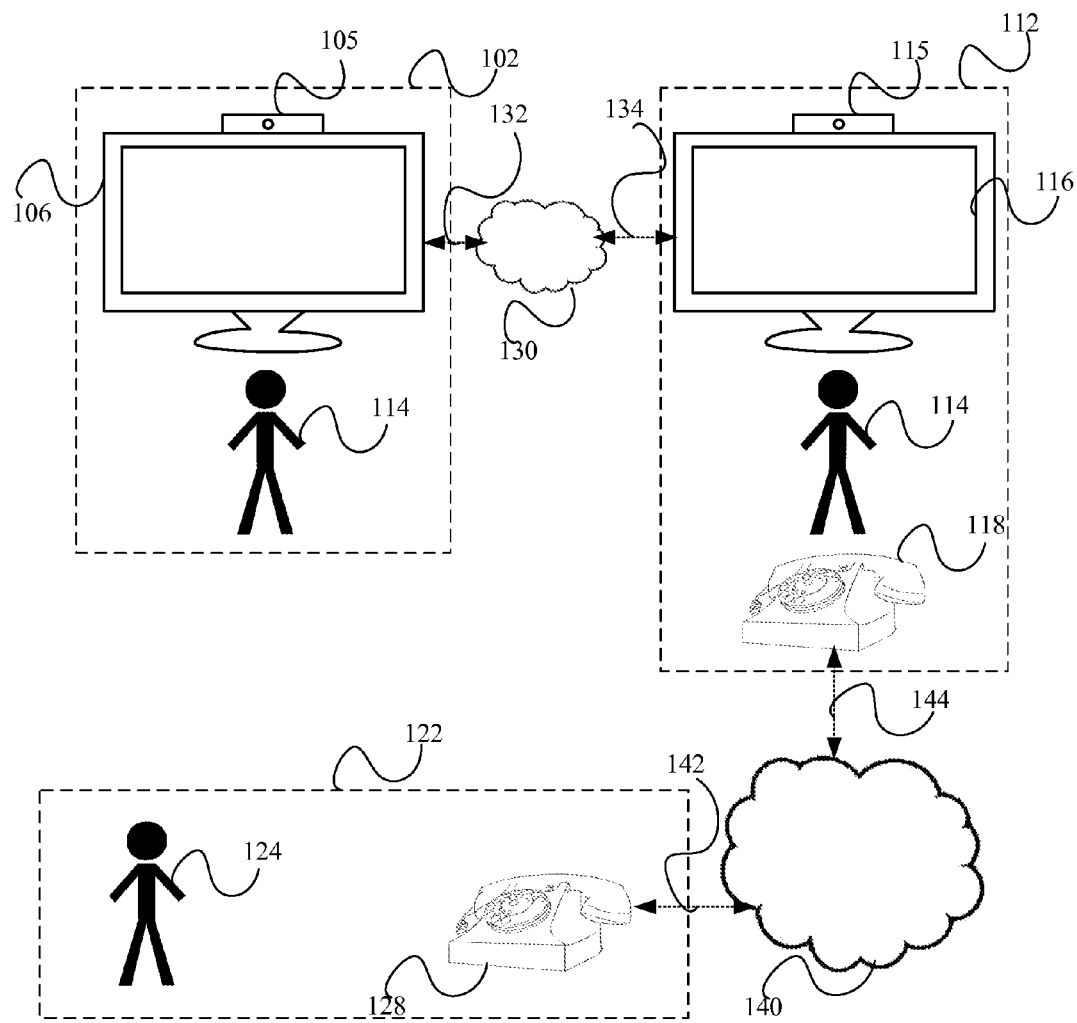
FIG. 1 is a schematic diagram showing a video relay service (VRS) suitable for implementing embodiments of the present invention.

FIG. 1 is a schematic diagram showing a video relay service (VRS) suitable for implementing embodiments of the present invention. Bounding box 102 is used to indicate the VRS "front end" or "customer side" equipment. Front end or customer side equipment is operated by a VRS customer, such as user 104. User 104 is located in proximity with VRS terminal 105 so that user 104 can interact with VRS terminal 105. User 104 is preferably a person who is deaf (D), hard-of-hearing (HOH), speech-impaired (SI), or any other person who communicates via sign language. User 104 interacts with VRS terminal 105 by viewing video on display 10 Display 106 is any device suitable for displaying to user 104 a video signal of a sign language interpreter, such as sign language interpreter 114, in sufficient quality so that a person fluent in sign language can comprehend the sign language interpreter. VRS terminal 105 includes a video capture device suitable for capturing a video signal of user 104 within the field-of-view of the camera at sufficient quality and frame rate to support sign language communication with a sign language interpreter. VRS terminal 105 also includes hardware and/or software to, substantially in real-time, convert the captured video signal into a data stream suitable for transmission over packet-switched network 130, such as an internet protocol (IP) network, over network link 132. VRS terminal 106 also includes hardware and/or software to transmit the data stream over packet-switched network 130 at sufficient network speed so that a remote VRS terminal, such as VRS terminal 115, can display the data stream as video on a display device, such as display 116, in sufficient quality for a sign language interpreter to comprehend sign language in the displayed video. VRS terminal 105 also includes hardware and/or software to, substantially in real-time, receive a data stream from a remote VRS terminal, such as VRS terminal 115, from packet-switched network 130 over network link 132, convert the data stream into a suitable video signal, and output the video signal to display 106.

Signaling over packet-switched network 130 is preferably implemented using session initiation protocol (SIP). Alternatively, signaling over packet-switched network 130 is implemented using the H.323 standard from the International Telecommunication Union Telecommunication Standardization Sector (ITU-T). Those skilled in the art will recognize that any signaling means suitable for transmitting and receiving video substantially in real-time is within the scope of the present invention.

In a preferred embodiment, display 106 is a high definition flat panel display with digital inputs, such as digital visual interface (DVI) or high-definition multimedia interface (HDMI) connectors. VRS terminal 105 includes digital outputs, such as digital visual interface (DVI) or high-definition multimedia interface (HDMI) connectors. VRS terminal 105 is connected to display 106 via compatible cabling, as is known in the art. User 104 can operate VRS terminal 105 by a remote input device, such as an infrared (IR), radio frequency (RF), or Bluetooth® handheld remote. VRS terminal 105 includes a digital video camera assembly mounted to the front-facing (i.e., user-facing) panel. The digital video camera includes an active pixel sensor, such as a complementary metal oxide semiconductor (CMOS) sensor or a charged coupled device (CCD) sensor. VRS terminal 105 includes a network interface for establishing network link 132 with packet-switched network 130, such as Ethernet support and a wired an RJ-45 connector and/or IEEE 802.11 "Wi-Fi" connectivity. VRS terminal 105 includes one or more universal serial bus (USB) connectors for connecting USB devices, such as flash accessory that can be used to alert a D-HOH user that an incoming call is waiting to be answered. VRS terminal 105 also includes an interface for flash storage media, such as a Secure Digital (SD) non-volatile memory card. VRS terminal 105 includes a clamp that can be used to fasten VRS terminal 105 to display 106 in so that the camera faces user 104 as user 104 views display 106. The clamp can be opened to be alternatively used as a desktop stand.

While the foregoing describes a preferred embodiment of the present invention, one skilled in the art will appreciate that various changes, substitutions and alterations can be made without departing from the scope of the invention. For example, a single device having an integrated VRS terminal 105 and display 106 is within the scope of the present invention. Moreover, a general purpose computer meeting the hardware requirements for video telephony over IP networks and programmed with software to perform the functions of VRS terminal 105 and display 106 as disclosed herein is within the scope of the present invention. Such general purpose computers include desktop personal computers (PC), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

Returning to FIG. 1, bounding box 112 is used to indicate the "back end" or "service side" equipment and a sign language interpreter. Back end or service side equipment is operated by the VRS service provider. Sign language interpreter 114 is located in such a way that interpreter 104 can interact with VRS terminal 115. While bounding box 112 shows only one sign language interpreter and one VRS terminal, one skilled in the art will understand that a VRS service provider may be a large enterprise including hundreds of sign language interpreters (or more) and sufficient service side equipment to provide around the clock VRS service to a large customer base.

Interpreter 114 is a preferably a person who can communicate via sign language and is proficient at sign language translation. Display 116 is any device suitable for displaying to interpreter 114 the video signal of a user 104 in sufficient quality so that interpreter 114 can comprehend the sign language from user 104. VRS terminal 115 includes a video capture device suitable for capturing a video signal of interpreter 114 within the field-of-view of the camera at sufficient quality and frame rate to support sign language communication with user 104. VRS terminal 115 also includes hardware and/or software to, substantially in real-time, convert the captured video signal into a data stream suitable for transmission over packet-switched network 130, such as an internet protocol (IP) network, over network link 134. VRS terminal 105 also includes hardware and/or software to transmit the data stream over packet-switched network 130 at sufficient network speed so that VRS terminal 105 can display the data stream as video on display device 106 in sufficient quality for user 104 to comprehend sign language in the displayed video. VRS terminal 115 also includes hardware and/or software to, substantially in real-time, receive a data stream from VRS terminal 105 from packet-switched network 130 over network link 134, convert the data stream into a suitable video signal, and output the video signal to display 116.

Bounding box 112 also includes traditional public switched telephone network equipment (PSTN), shown in FIG. 1 as telephone 118. While a simple telephone 118 is shown, one skilled in the art would understand that any type of equipment for making and receiving PSTN calls is within the scope of the present invention, including complex enterprise-level telephone systems, computers adapted for placing telephone calls, and cellular telephones. Telephone 118 is connected to the public switched telephone network (PSTN)

140 by network link 144 and is capable of making and receiving traditional circuit switched telephone calls to PSTN telephone numbers.

Bounding box 122 is used to indicate a traditional PSTN subscriber, hearing person 124, and equipment, telephone 128. Hearing person 124 is a person who has the ability to communicate over PSTN using at least one spoken language via telephone 128. Telephone 128 is connected to the public switched telephone network (PSTN) 140 by network link 142 and is capable of making and receiving traditional circuit switched telephone calls to PSTN telephone numbers. While a simple telephone 128 is shown, one skilled in the art would understand that any type of equipment for making and receiving PSTN calls is within the scope of the present invention, including complex enterprise-level telephone systems, computers adapted for placing telephone calls, and cellular telephones.

User 104 initiates a VRS video call with Interpreter 114. Interpreter 114 then uses telephone 118 to call hearing person 124 on behalf of user 104. The call to hearing person 124 may be placed automatically by service side equipment. Interpreter 114 and user 104 communicate using sign language via VRS terminal 105 and VRS terminal 115. Interpreter 114 and hearing person 124 communicate using spoken language via telephone 118 and telephone 128. In this way, interpreter 114 acts as an intermediary between user 104 and hearing person 124, interpreting the communication between user 104 and hearing person 124.

Figure 2:
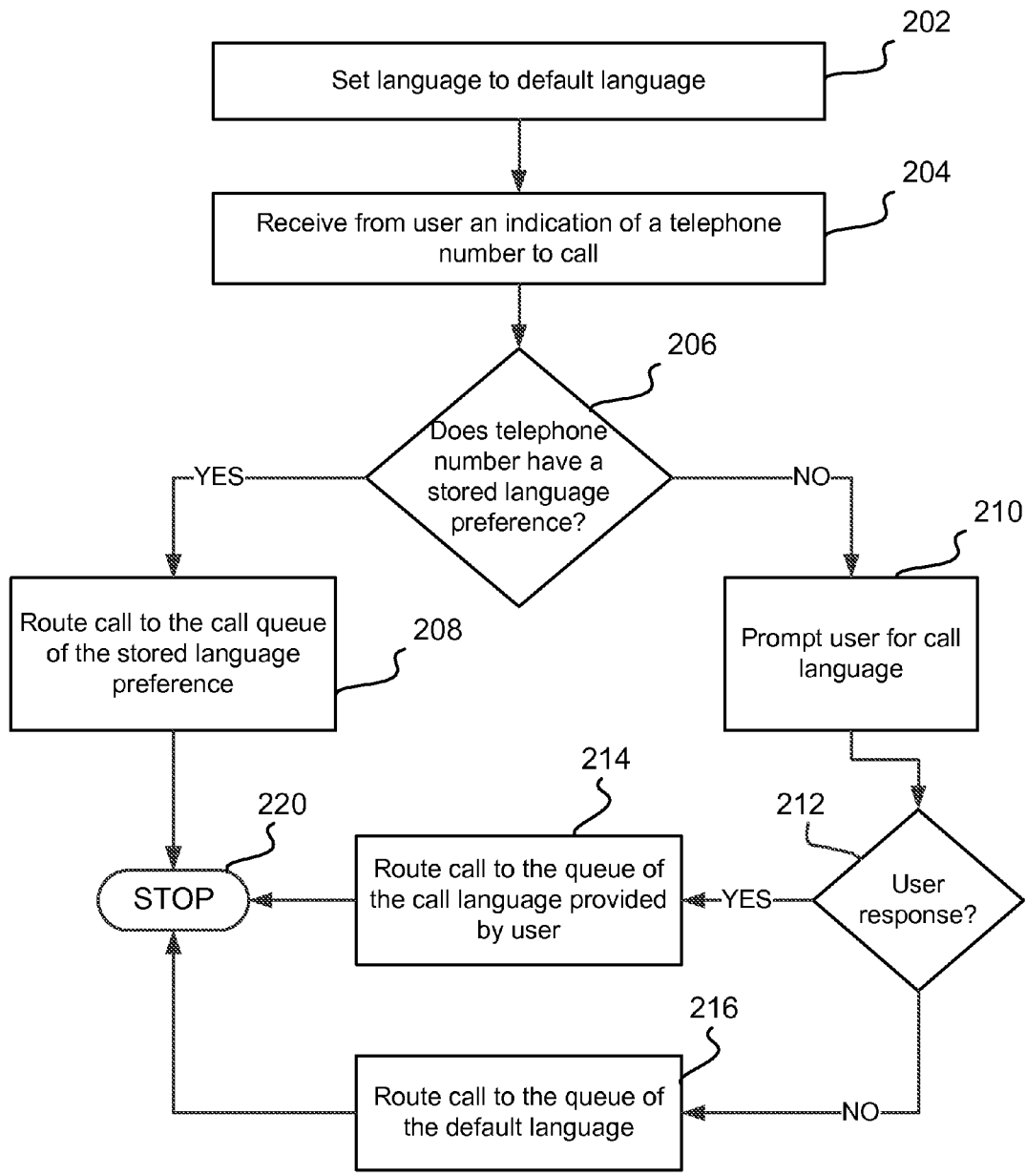
FIG. 2 is a flowchart showing a method of initiating a VRS call in accordance with one or more embodiments of the present invention.

FIG. 2 is a flowchart showing a method of initiating a VRS call in accordance with one or more embodiments of the present invention. In step 202, a default language is set for VRS terminal 105 and stored in persistent memory. This step is performed when VRS is first set up to make calls, but can be changed by user 104. The default language setting is a global setting for all calls. The default language setting is preferably set for the spoken language in which user 104 is fluent or the language spoken by the hearing people whom user 104 calls most frequently. In step 204, input is received from user 104 indicating a telephone number which user 104 would like to call. The input is preferably received from a handheld remote control device in communication with VRS terminal 105. Alternatively, the input can be received from a touch screen, from a keyboard, from a pointing device, or from other well-known means of receiving user input. The input received from user 104 can be the telephone number itself, or a pointer referencing a number stored in memory, such as in an address book or a call history list. In step 206, VRS terminal 105 determines whether there is a stored language preference associated with the telephone number. In a preferred embodiment, a language preference for each telephone number can be stored in persistent memory and is accessible to and editable by the user, for example, by an address book application program. One skilled in the art would understand that the language preference may be stored in local on VRS terminal 105, cached in local memory on VRS terminal 105, or stored remotely over network 130 (e.g., "cloud storage") and retrieved on demand by VRS terminal 105.

If the telephone number has a stored language preference associated with it then, in step 208, the call is routed to the call queue of the stored language preference and the process then ends at terminator 220. That is, the call is directed to a sign language interpreter 114 who is fluent in the spoken language indicated by the language preference. If no sign language interpreter 114 fluent in the spoken language indicated by the language preference is available, then the call is placed in a call queue for the next available sign language interpreter fluent in the spoken language indicated by the language preference. In this way, user can assign a spoken language to a telephone number and be immediately directed to the call queue for that spoken language instead of being directed to a global default language call queue and then wait to be transferred to a call queue for another language.

For example, user 104 may be a D-HOH-SI person who is fluent in ASL as well as Spanish. User 104 may need to speak to a plumber who is performing service at the residence of user 104. However, the plumber is fluent in neither ASL nor Spanish, but is instead fluent in English. In the prior art, user 104 places a VRS call and be directed to the Spanish call queue. When a Spanish sign language interpreter becomes available, user 104 must ask to have the called transferred to the English call queue and wait for the next available English sign language interpreter. The plumber waits with user 104 for a call to be received on the plumber's mobile phone from an English sign language interpreter. As can be seen from this example, eliminating waiting in an unnecessary call queue (i.e., the Spanish call queue) will facilitate communication between user 104 and the plumber performing service at the residence of user 104.

If the telephone number does not have a stored language preference associated with it then, in step 210, VRS terminal 105 prompts the user for a call language. The call language is a language preference for that particular call. VRS terminal 105 preferably prompts the user for the call language via a dialog box in the graphical user interface of VRS terminal 105. User 104 preferably makes a selection using an input device, such as a handheld remote or a touch screen. In step 212, it is determined whether the user selected a call language. If the user selects a call language then, in step 214, the call is routed to the queue of the call language provided by the user. That is, the call language provided by the user for this particular call overrides and takes precedence over the globally assigned default language preference. In this way, user 104 can easily avoid waiting in the wrong language queue when user 104 knows what language is needed, but language preference for that telephone number may not yet be stored. In preferred embodiments, VRS terminal 105 automatically stores the selected call language in persistent memory as a stored language preference for the telephone number so that user 104 does not have to be prompted for a call language the next time user 104 attempts to call that telephone number. Alternatively, VRS terminal 105 prompts user 104 whether to store the call language in persistent memory as a stored language preference for the telephone number. The process then ends at terminator 220.

If the user does not provide a call language at step 212 then, in step 216, the call is routed to the call queue of the default language and the process ends at terminator 220.

Figure 3:
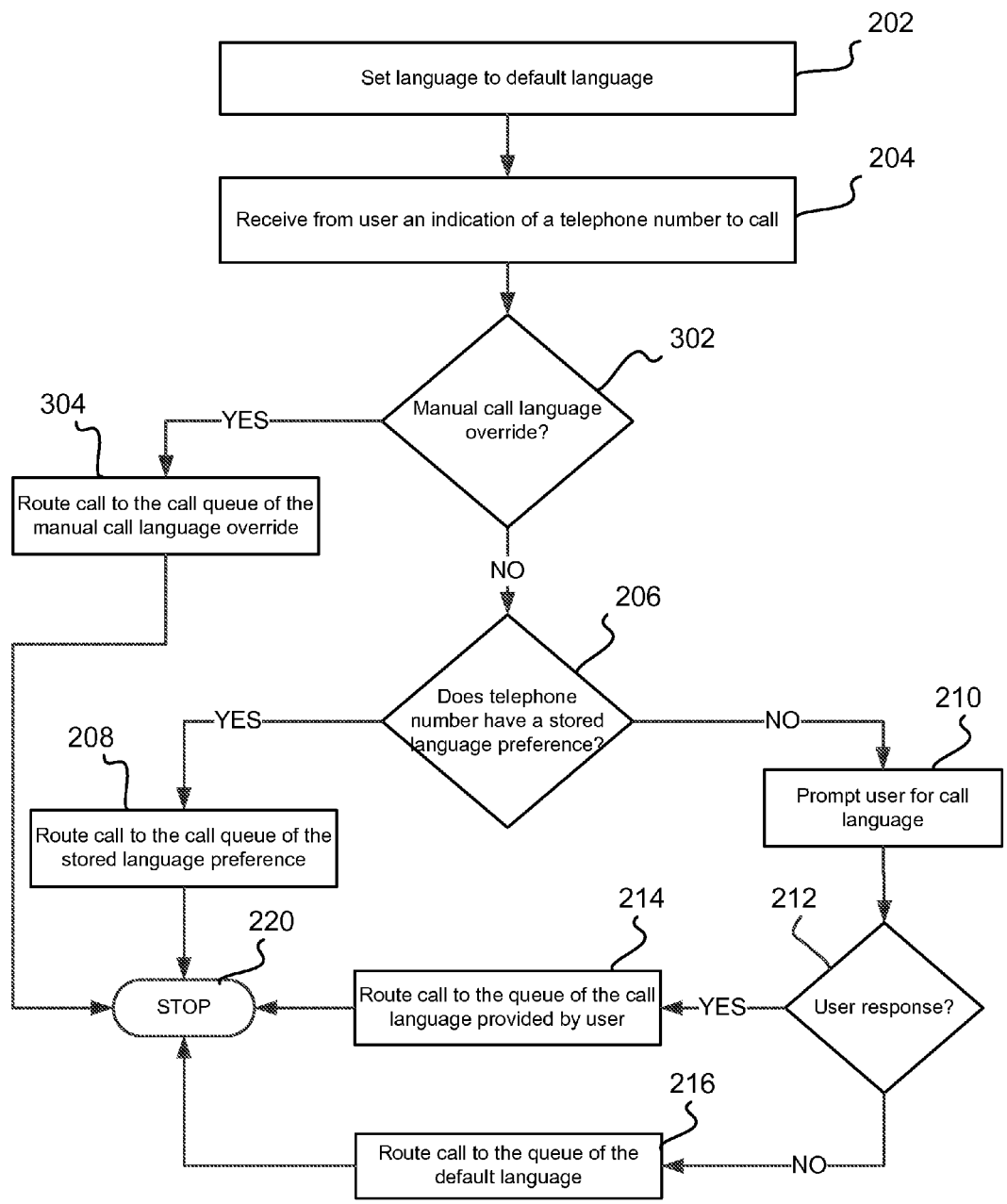
FIG. 3 is a flowchart showing an alternative method of initiating a VRS call in accordance with one or more embodiments of the present invention.

FIG. 3 is a flowchart showing an alternative method of initiating a VRS call in accordance with one or more embodiments of the present invention. The method is similar to FIG. 2, except that a manual call option override is provided. Before determining whether a telephone number has a stored language preference in step 206, VRS terminal 105, at step 302, determines whether user 104 has provided a manual call language override. The manual call override gives user 104 the option to enter a call language queue of his or her choosing regardless of whether there is a stored language preference for the telephone number. If a manual call language override is provided in step 302 then, in step 304, the call is routed to the call queue of the manual call language override and the process ends at terminator 220 without determining whether there is a stored language preference for the telephone number in step 206. If a manual call language override is not provided in step 302, then the process proceeds to step 206 and VRS terminal 105 determines whether there is a stored language preference for the telephone number.

Figure 4:
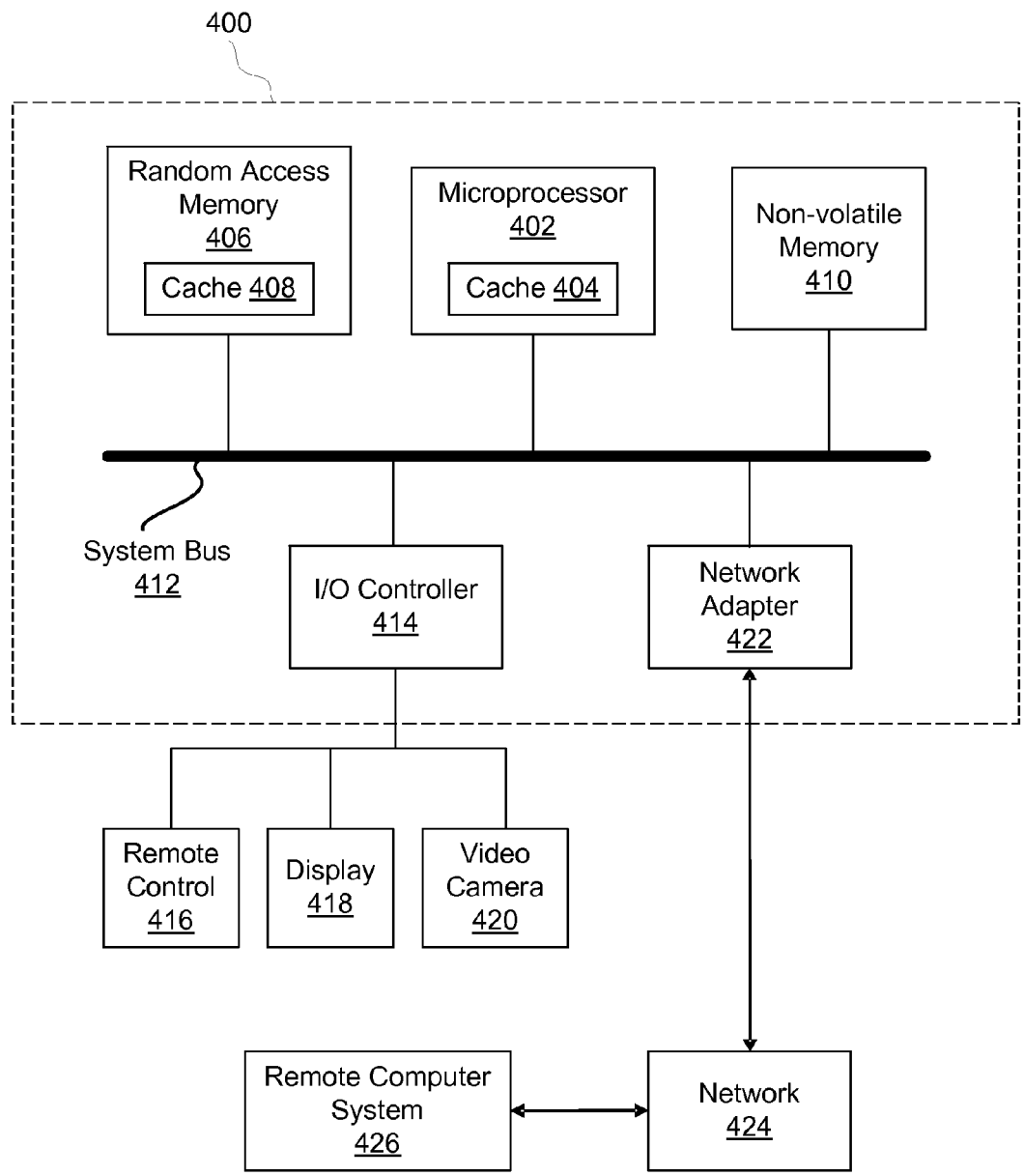
FIG. 4 is a schematic of an exemplary hardware configuration suitable for implementing one or more embodiments of the present invention.

FIG. 4 is a schematic of an exemplary hardware configuration suitable for implementing one or more embodiments of the present invention. System 400, suitable for implementing VRS terminals 105 and 115, includes at least one microprocessor 402 coupled directly or indirectly to other logic units and memory elements through system bus 412. Microprocessor 402 executes computer instructions on data according to an instruction set architecture (ISA). The memory elements comprise a tangible computer-readable medium. Random access memory 406 is employed during the actual execution of computer instructions comprising program code. Non-volatile memory 410 comprises persistent bulk data storage, such as a hard disk drive (HDD), a solid state drive (SSD), and/or a removable media drive. Cache memories 404 and 408 provide temporary storage of at least some program code in order to reduce the number of times code must be retrieved from non-volatile memory 410 during program execution. While FIG. 4 shows memory elements connected to the processor by a single system bus, system bus 412, one skilled in the art will understand that alternative memory access configurations using more than one bus, such as direct memory access (DMA), northbridges and southbridges, etc., are within the scope of the invention. Input/output (I/O) devices can be coupled to the system either directly or through intervening I/O controllers 414. I/O devices can include a wireless IR or RF handheld remote control, a display 418 (such as display 106 or 116), and a video camera 420. Video camera 420 may be connected to a special video processing unit (not shown). Network adapters 422 may also be coupled to system 400 to enable the system to communicate with remote computer system 426 or remote printers or storage devices through intervening private or public networks 424. Modems, cable modems, Ethernet cards, and wireless network adapters are just a few of the currently available types of network adapters.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer-implemented method for automatically routing a video relay service call to a call queue, the method comprising:
   receiving a first input from a user to initiate a video relay service call, the input being indicative of a telephone number;
   determining whether data stored in a computer memory includes a language associated with the telephone number;
   in response to the stored data including a language associated with the telephone number, routing a video relay service call to a call queue for one or more sign language interpreters fluent in the language associated with the telephone number;
   in response to the stored data not including a language associated with the telephone number:
      prompting the user to select a language, receiving a second input from the user, the second input being indicative of a selected language, and routing a video relay service call to a call queue for one or more video interpreters fluent in the selected language; or
      routing a video relay service call to a call queue for one or more video interpreters fluent in a default language, the default language being stored in the computer memory as a language setting for all video relay service calls.

2. The method of claim 1, further comprising associating selected language of the second input with the telephone number and storing the association as stored data in the computer memory.

3. The method of claim 1, further comprising prompting the user to determine whether the selected language of the second input should be associated with the telephone number and, in response to receiving user input that the selected language of the second input should be associated with the telephone number, storing the association as stored data in the computer memory.

4. The method of claim 1, further comprising prompting the user to determine whether the selected language of the second input should be associated with the telephone number and, in response to receiving user input that the selected language of the second input should be associated with the telephone number, storing the association as stored data in the computer memory.

5. The method of claim 1, in which the video relay service call is initiated by using session initiation protocol (SIP) or the H.323 standard.

6. The method of claim 1, in which the stored data is accessible to the user by an address book application program executing on the device initiating the video relay service call.

7. A device for making video relay service calls, the device comprising:
   a microprocessor coupled to a system bus;
   a computer-readable memory coupled to the system bus;
   a video capture device coupled to the system bus;
   a network adapter coupled to the system bus;
   the computer-readable memory being encoded with computer-executable instructions that, when executed by the microprocessor, cause the device to perform the steps of:
      receiving a first input from a user to initiate a video relay service call, the input being indicative of a telephone number;
      determining whether data stored in the computer-readable memory includes a language associated with the telephone number;
      in response to the stored data including a language associated with the telephone number, routing a video relay service call to a call queue for one or more sign language interpreters fluent in the language associated with the telephone number;
      in response to the stored data in the computer-readable memory not including a language associated with the telephone number:
         prompting the user to select a language, receiving a second input from the user, the second input being indicative of a selected language, and routing a video relay service call to a call queue for one or more video interpreters fluent in the selected language; or routing a video relay service call to a call queue for one or more video interpreters fluent in a default language, the default language being stored in the computer-readable memory as a language setting for all video relay service calls.

8. The device of claim 7, further comprising computer-executable instructions for associating selected language of the second input with the telephone number and storing the association as stored data in the computer-readable memory.

9. The device of claim 7, further comprising computer-executable instructions for prompting the user to determine whether the selected language of the second input should be associated with the telephone number and, in response to receiving user input that the selected language of the second input should be associated with the telephone number, storing the association as stored data in the computer memory.

10. The device of claim 7, further comprising computer-executable instructions for prompting the user to determine whether the selected language of the second input should be associated with the telephone number and, in response to receiving user input that the selected language of the second input should be associated with the telephone number, storing the association as stored data in the computer memory.

11. The device of claim 7, in which the video relay service call is initiated by using session initiation protocol (SIP) or the H.323 standard.

12. The device of claim 7, in which the stored data is accessible to the user by an address book application program executing on the device.

13. A system for making video relay service calls, the system comprising:
 a microprocessor coupled to a system bus;
 a computer-readable memory coupled to the system bus;
 a video capture device coupled to the system bus;
 a network adapter coupled to the system bus;
 a display coupled to the system bus;
 an input device coupled to the system bus;
 the computer-readable memory being encoded with computer-executable instructions that, when executed by the microprocessor, cause the device to perform the steps of:
  receiving a first input from a user via the input device to initiate a video relay service call, the input being indicative of a telephone number;
  determining whether data stored in the computer-readable memory includes a language associated with the telephone number;
  in response to the stored data including a language associated with the telephone number, routing a video relay service call to a call queue for one or more sign language interpreters fluent in the language associated with the telephone number;
  in response to the stored data in the computer-readable memory not including a language associated with the telephone number:
   prompting the user to select a language, receiving a second input from the user via the input device, the second input being indicative of a selected language, and routing a video relay service call to a call queue for one or more video interpreters fluent in the selected language; or
   routing a video relay service call to a call queue for one or more video interpreters fluent in a default language, the default language being stored in the computer-readable memory as a language setting for all video relay service calls.

14. The system of claim 13, further comprising computer-executable instructions for associating selected language of the second input with the telephone number and storing the association as stored data in the computer-readable memory.

15. The system of claim 13, further comprising computer-executable instructions for prompting the user to determine whether the selected language of the second input should be associated with the telephone number and, in response to receiving user input that the selected language of the second input should be associated with the telephone number, storing the association as stored data in the computer memory.

16. The system of claim 13, further comprising computer-executable instructions for prompting the user to determine whether the selected language of the second input should be associated with the telephone number and, in response to receiving user input that the selected language of the second input should be associated with the telephone number, storing the association as stored data in the computer memory.

17. The system of claim 13, in which the video relay service call is initiated by using session initiation protocol (SIP) or the H.323 standard.

18. The system of claim 13, in which the stored data is accessible to the user by an address book application program executing on the device.

19. The system of claim 13, in which the input device is coupled to the system bus by wireless communication means.

20. The system of claim 19, in which the wireless communications means are selected from a group comprising: infrared (IR) communication, radio frequency (RF) communication, and Bluetooth.

* * * * *